United States Patent [19]

Littlepage

[11] Patent Number: 5,188,156
[45] Date of Patent: Feb. 23, 1993

[54] WASTE OIL RECYCLING APPARATUS

[76] Inventor: Mike Littlepage, 2809 Woodbridge Ct., Modesto, Calif. 95355

[21] Appl. No.: 811,962

[22] Filed: Dec. 23, 1991

[51] Int. Cl.$^5$ .................. B65B 39/00; B67C 11/04
[52] U.S. Cl. .................. 141/98; 141/106; 141/364; 141/331; 141/334; 141/340; 141/339; 141/114; 141/314; 141/244; 184/1.005; 184/106; 220/573
[58] Field of Search .................. 141/98, 106, 364, 365, 141/331, 333, 334, 339, 340–347, 342, 375, 114, 313–316, 242, 244; 184/1.5, 106; 220/571, 573

[56] References Cited

U.S. PATENT DOCUMENTS

| | | | |
|---|---|---|---|
| 272,415 | 2/1883 | Crapon et al. | 141/339 X |
| 2,696,336 | 12/1954 | Van Drunen | 141/341 |
| 3,654,969 | 4/1972 | Vazguez | 141/106 |
| 4,114,660 | 9/1978 | Arruda | 141/98 |
| 4,579,155 | 4/1986 | Zola | 141/86 |
| 4,697,670 | 10/1987 | Arruda | 141/1.5 |
| 4,702,290 | 10/1987 | Perez | 141/332 |
| 4,762,155 | 9/1988 | Gruber | 185/1.5 X |
| 4,832,095 | 5/1989 | Bonnell | 141/106 |
| 5,002,100 | 3/1991 | Frederick | 141/242 X |

Primary Examiner—Ernest G. Cusick
Attorney, Agent, or Firm—Hugh E. Smith

[57] ABSTRACT

An apparatus to include a storage container arranged for vertical mounting to a support surface, wherein the storage container mounts an outlet conduit and valve associated therewith. The container is provided with a cavity to receive and store a fluid-receiving pan container permitting ease of disposal of waste oil from an associated vehicular oil change. Waste oil containers are thereafter positioned below the storage container conduit to receive the waste oil for subsequent recycling. A modification of the invention includes a first and second storage container mounted to opposed side walls of the primary storage container to include respective granular absorbing material and saturated oil absorbing material respectively. An underlying tray is positioned below a manifold mounted to the container conduit for permitting filling of a plurality of waste oil containers simultaneously.

3 Claims, 4 Drawing Sheets

WASTE OIL RECYCLING APPARATUS

BACKGROUND OF THE INVENTION

1. Field of the Invention

The field of invention relates to recycling apparatus, and more particularly pertains to a new and improved waste oil recycling apparatus wherein the same is directed to the safe and clean recycling of waste oil from vehicular oil changes.

2. Description of the prior Art

Recycling apparatus of various types are utilized throughout the prior art. The disposing of oil from an associated vehicle becomes an ecological as well as sanitary consideration. The U.S. Pat. No. 4,762,155 to Gruber sets forth a bag member arranged within a container to receive waste oil as the bag member and associated granular material therewithin is subsequently deposited.

U.S. Pat. No. 4,823,947 to Maynard, Jr.; U.S. Pat. No. 4,974,647 Fastom; and U.S. Pat. No. 4,533,042 to Pollacco are further examples of prior art structures for receiving waste oil.

As such, it may be appreciated that there continues to be a need for a new and improved waste oil recycling apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of waste oil recycling apparatus now present in the prior art, the present invention provides a waste oil recycling apparatus wherein the same utilizes a storage container to receive waste oil and permit subsequent deposit of such waste oil within individual storage containers As such, the general purpose of the present invention, which will be described subsequently in greater detail, is to provide a new and improved waste oil recycling apparatus which has all the advantages of the prior art waste oil recycling apparatus and none of the disadvantages.

To attain this, the present invention provides an apparatus including a storage container arranged for vertical mounting to a support surface, wherein the storage container mounts an outlet conduit and valve associated therewith. The container is provided with a cavity to receive and store a fluid-receiving pan container permitting ease of disposal of waste oil from an associated vehicular oil change. Waste oil containers are thereafter positioned below the storage container conduit to receive the waste oil for subsequent recycling. A modification of the invention includes a first and second storage container mounted to opposed side walls of the primary storage container to include respective granular absorbing material and saturated oil absorbing material respectively. An underlying tray is positioned below a manifold mounted to the container conduit for permitting filling of a plurality of waste oil containers simultaneously.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved waste oil recycling apparatus which has all the advantages of the prior art waste oil recycling apparatus and none of the disadvantages.

It is another object of the present invention to provide a new and improved waste oil recycling apparatus which may be easily and efficiently manufactured and marketed.

It is a further object of the present invention to provide a new and improved waste oil recycling apparatus which is of a durable and reliable construction.

An even further object of the present invention is to provide a new and improved waste oil recycling apparatus which is susceptible of a low cost of manufacture with regard to both materials and labor, and which accordingly is then susceptible of low prices of sale to the consuming public, thereby making such waste oil recycling apparatus economically available to the buying public.

Still yet another object of the present invention is to provide a new and improved waste oil recycling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWING

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
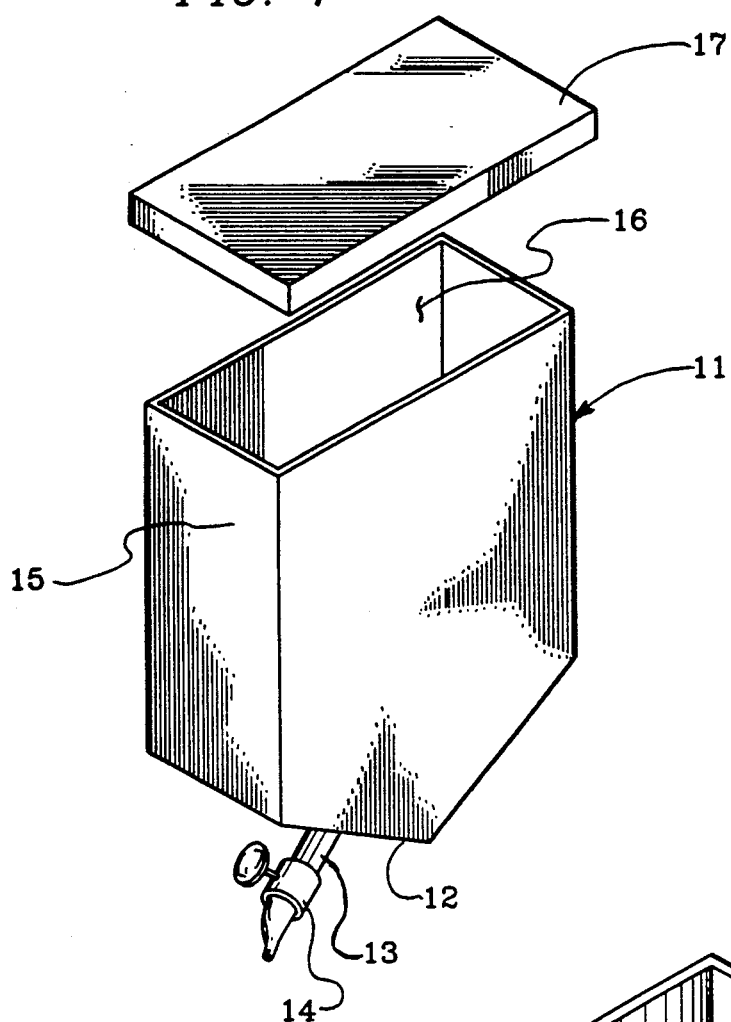
FIG. 1 is an isometric illustration of the storage container of the invention.

With reference now to the drawings, and in particular to FIGS. 1 to 8 thereof, a new and improved waste oil recycling apparatus embodying the principles and concepts of the present invention and generally designated by the reference numeral 10 will be described.

Figure 2:
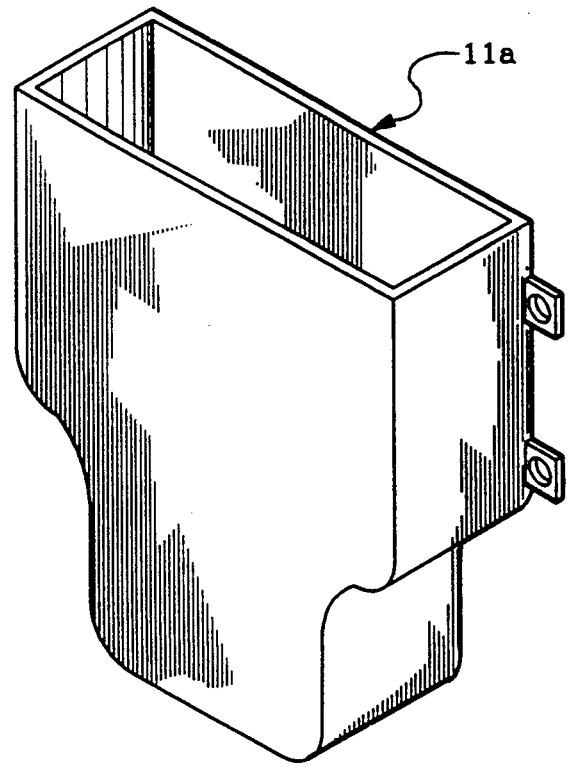
FIG. 2 is an isometric illustration of a modified configuration of the storage container.
Figure 3:
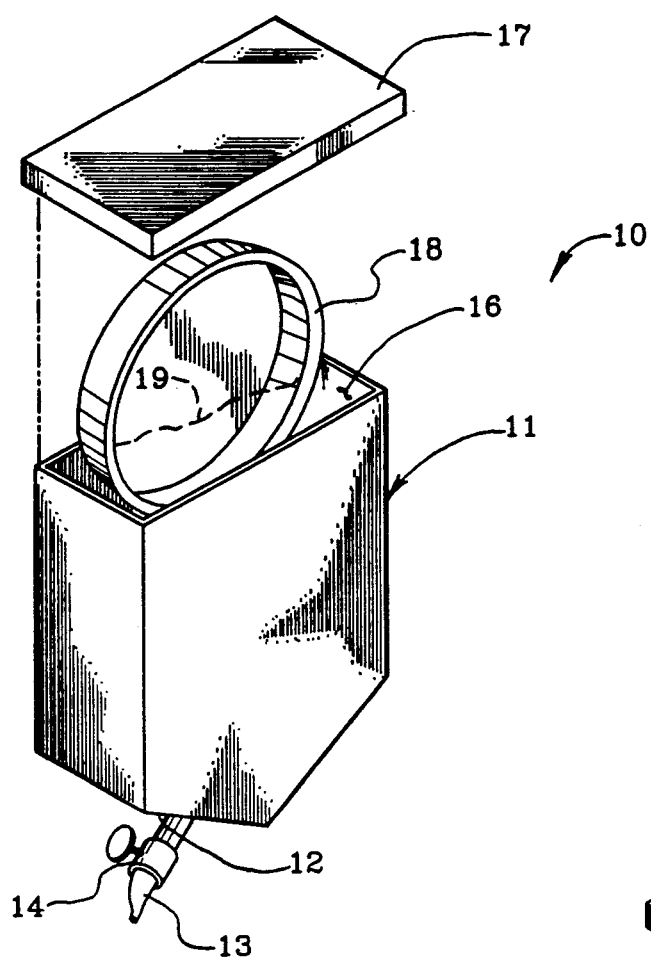
FIG. 3 is an isometric illustration of the storage container including the associated fluid-receiving pan container therewithin.
Figure 4:
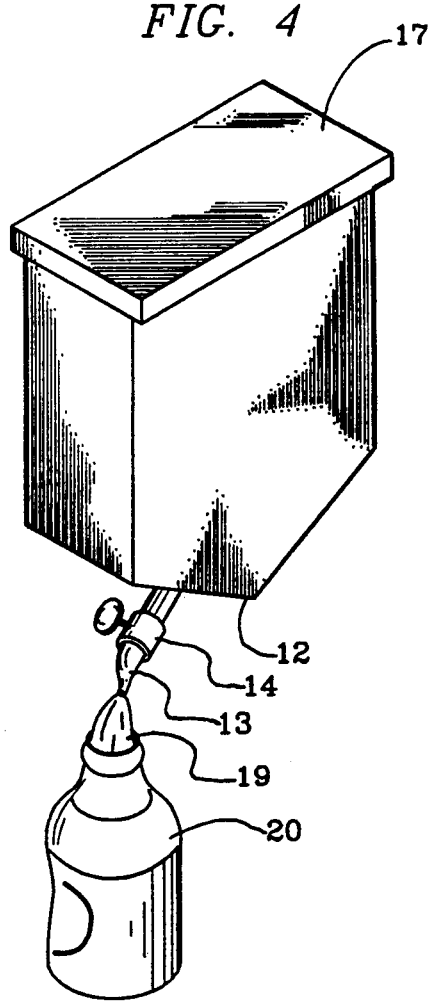
FIG. 4 is an isometric illustration of the container depositing the waste oil within associated waste oil containers.

More specifically, the waste oil recycling apparatus 10 of the instant invention essentially comprises a storage container 11 with a bottom wall 12, with a bottom wall conduit 13 directed into the bottom wall in communication with a container cavity 16 within the storage container 11. The bottom wall conduit 13 includes a conduit valve 14 operative to selectively direct fluid flow therethrough. The storage container includes respective side walls 15 spaced apart a predetermined width. A container lid 17 is arranged for mounting to an upper distal end of the storage container 11 for enclosure of contents therewithin. The FIG. 2 illustrates a modified container 11a utilizing associated bracketry for ease of horizontal mounting of the container, wherein such bracketry is well known in the art to be employed by the container 11 as required.

The storage container 11 further includes a fluid-receiving pan container 18 receivable within the cavity 16, as the pan container 18 is defined by a predetermined pan width less than the predetermined width permitting reception of the pan container within the cavity. Further, the container cavity 16 is defined by a predetermined height greater than the predetermined pan width to further effect total enclosure of the pan permitting its positioning within the storage container 11. Waste oil 19 within the pan container 18 received from various sources such as motor vehicles is deposited within the cavity 16. Subsequently, waste oil containers 20 are positioned below the conduit 13 in communication therewith to permit reception of the waste oil 19 therewithin permitting selective recycling of the waste oil as conveniently available.

Figure 5:
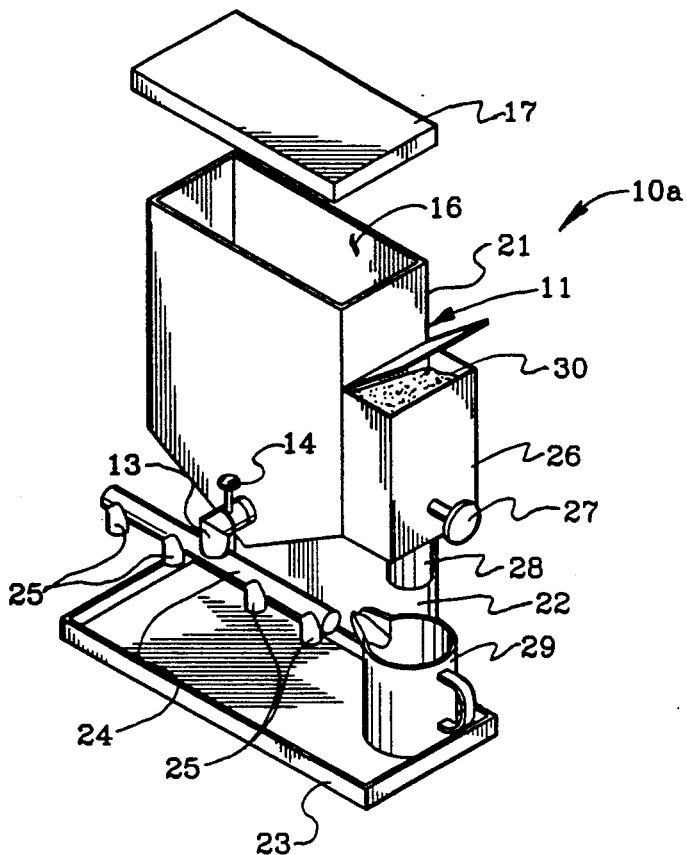
FIG. 5 is an isometric illustration of a modification of the invention.

The storage container 11 as indicated in the aspect of the invention 10a set forth in FIG. 5 includes a first storage container 26 mounted to a first side wall of the storage container 11. The storage container 26 includes a first container lid 26a, with a first container valve 27 positioned adjacent and in communication with a first container outlet conduit 28 permitting granular flow therethrough of a granular oil absorbing material 30. The oil absorbing material 30 is received within a dispensing container 29 positioned below the storage container 26 and arranged for mounting upon a storage tray 23 positioned below the container 11. The support tray 23 is fixedly mounted orthogonally to a lower distal end of a mounting flange 22 that in turn is fixedly mounted to a container rear wall 21. The bottom wall conduit 13 further includes a fluid manifold 24 including a plurality of outlet ports 25. Each of the outlet ports 25 are positioned above the tray 23 permitting accommodation of a plurality of waste oil containers 28 to be mounted upon the tray and below the outlet ports 25 for simultaneous filling of a plurality of the waste oil containers 20.

Figure 6:
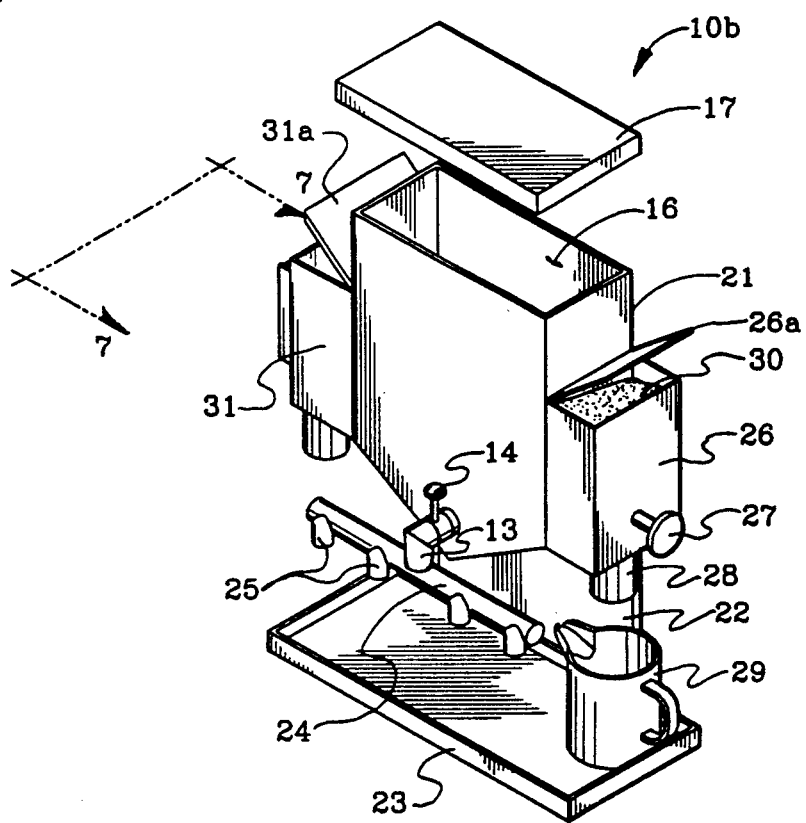
FIG. 6 is an isometric illustration of a further modification of the invention.
Figure 7:
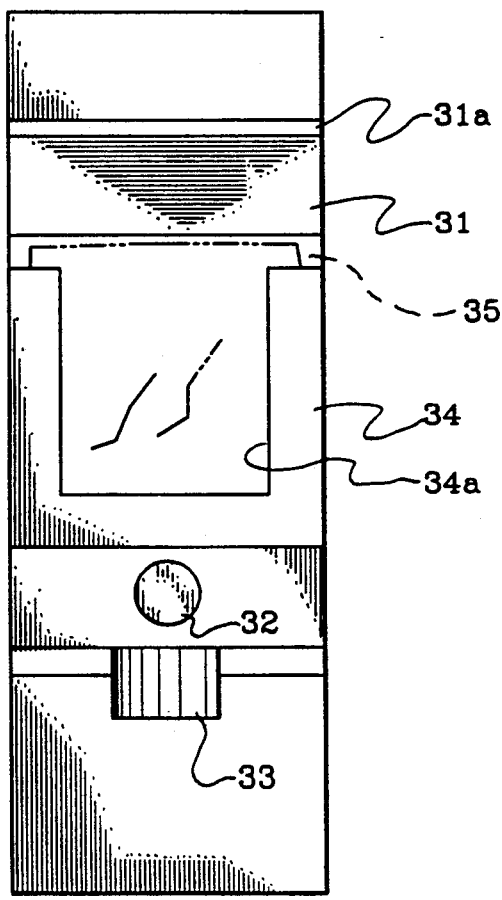
FIG. 7 is an orthographic view, taken along the lines 7-7 of FIG. 6 in the direction indicated by the arrows.
Figure 8:
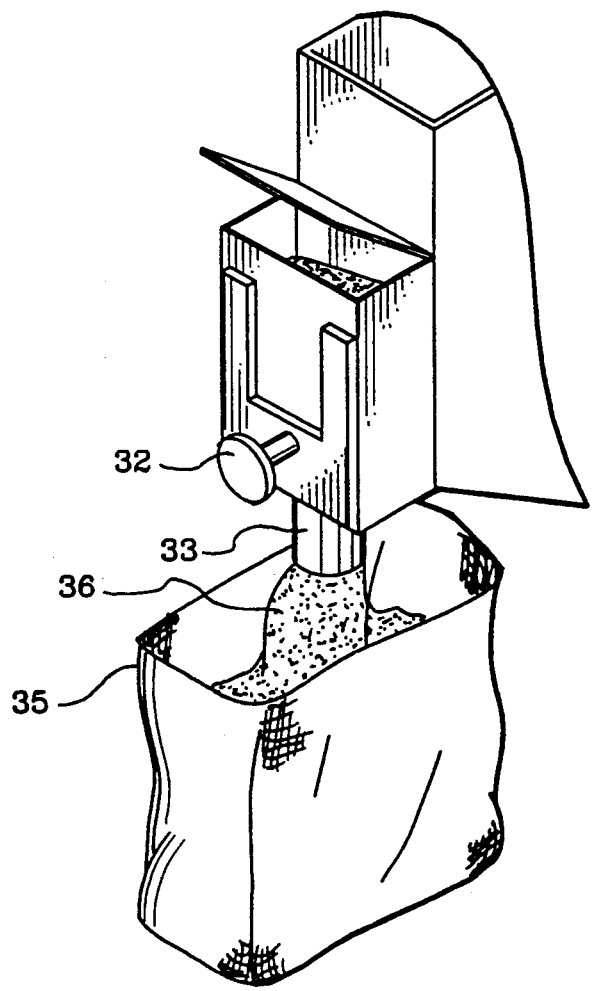
FIG. 8 is an isometric illustration of the saturated granular material deposited within an associated receiving bag.

The apparatus 10b, as illustrated in FIGS. 6-8, further includes a second storage container 31 including a second storage container lid and a second storage container valve positioned adjacent a lower distal end of the second storage container 31 in operative communication with a second storage container outlet conduit 33. The second storage container 31 is arranged for reception of saturated granular material 30 depicted as numeral 36 in the FIG. 8 for example, wherein a storage hopper 34 is mounted to a front wall of the second storage container 31 receiving a plurality of bag members 35. The bag members are formed of a fluid impermeable material and the storage hopper 34 is formed with a front wall opening 34a permitting ease of access to the bag members 35 that are positioned below the second container outlet conduit 33 to receive the saturated material 36 for ease of deposit of such material subsequent to use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A waste oil recycling apparatus, comprising,
   a storage container, a storage container including a container bottom wall,
   and
   spaced side walls, including a first side wall and a second side wall,
   and
   the storage container defining a container cavity therewithin, and a conduit directed through the container adjacent the bottom wall in fluid communication with the container cavity, the container cavity defined by a predetermined width and a predetermined height, and a container lid selectively securable to an upper distal end of the container, and a fluid-receiving pan container defined by a predetermined pan width, wherein the predetermined pan width is less than the predetermined height, and said pan container is removably received within said container cavity, and the conduit includes a conduit valve to permit selective fluid flow through the conduit, and the storage container further includes a storage container rear wall, the storage container rear wall includes a mounting flange coplanar with and directed downwardly relative to the storage container bottom wall, and the mounting flange having a lower distal end and including a support tray orthogonally mounted to the lower distal end of the mounting flange, wherein the support tray is positioned below the storage container bottom wall.

2. An apparatus as set forth in claim 1 wherein the bottom wall conduit includes a fluid manifold mounted to the bottom wall conduit, the fluid manifold including a plurality of outlet ports through the fluid manifold, wherein the outlet ports are positioned over the support tray.

3. An apparatus as set forth in claim 2 including a first storage container having an upper distal end and a first storage container bottom wall mounted to one of said side walls of the storage container, wherein the first storage container includes a storage container lid mounted to the upper distal end of the first storage container, and a first storage container outlet container directed through the first storage container bottom wall, wherein the first storage container conduit includes a first storage container valve in operative communication with the first storage container conduit to effect selective flow therethrough, and a predetermined quantity of granular oil absorbing material positioned within the first storage container, and the first storage container conduit positioned over the support tray.

* * * * *